US008830494B2

(12) United States Patent
Kuo et al.

(10) Patent No.: US 8,830,494 B2
(45) Date of Patent: Sep. 9, 2014

(54) SHEET SENSING MODULE AND DUPLEX SCANNING APPARATUS USING THE SAME

(75) Inventors: Ping-Hung Kuo, Taipei (TW); Yi-Liang Chen, Taipei (TW); Wei-Hsun Hsu, Taipei (TW); Szu-Chieh Wu, Taipei (TW)

(73) Assignee: Primax Electronics Ltd., Taipei (TW)

( * ) Notice: Subject to any disclaimer, the term of this patent is extended or adjusted under 35 U.S.C. 154(b) by 266 days.

(21) Appl. No.: 13/463,569

(22) Filed: May 3, 2012

(65) Prior Publication Data

US 2013/0128294 A1 May 23, 2013

(30) Foreign Application Priority Data

Nov. 18, 2011 (TW) ............................ 100142332 A

(51) Int. Cl.

| | |
|---|---|
| ***G03G 15/00*** | (2006.01) |
| ***B65H 7/02*** | (2006.01) |
| ***B65H 1/18*** | (2006.01) |
| ***G06F 3/12*** | (2006.01) |
| ***H04N 1/04*** | (2006.01) |
| ***B65H 85/00*** | (2006.01) |
| ***B41J 3/60*** | (2006.01) |

(52) U.S. Cl.

CPC ............... *B41J 3/60* (2013.01); *B65H 2801/39* (2013.01); *B65H 85/00* (2013.01); *B65H 2301/33312* (2013.01); *B65H 2553/412* (2013.01); *B65H 2553/612* (2013.01); *B65H 2405/3321* (2013.01)

USPC ..... 358/1.13; 358/498; 358/488; 271/258.01; 271/258.05; 271/265.01; 271/265.02; 271/265.03; 271/153; 399/16; 399/17; 399/23; 399/367; 399/371; 399/373; 399/374; 399/388; 399/391

(58) Field of Classification Search

CPC .......... H04N 1/00572; H04N 1/00575; H04N 1/00578; H04N 1/0058; H04N 1/00705; H04N 1/00729; H04N 1/00732; H04N 1/00734; H04N 1/00755; H04N 1/52

See application file for complete search history.

(56) References Cited

U.S. PATENT DOCUMENTS

| | | | | |
|---|---|---|---|---|
| 4,583,844 | A * | 4/1986 | Honda | 399/124 |
| 6,926,272 | B2 * | 8/2005 | Carter et al. | 271/258.01 |
| 2002/0030321 | A1 * | 3/2002 | Sugiyama et al. | 271/226 |
| 2005/0035540 | A1 * | 2/2005 | Carter et al. | 271/303 |
| 2005/0189709 | A1 * | 9/2005 | Bokelman et al. | 271/265.01 |

* cited by examiner

*Primary Examiner* — King Poon
*Assistant Examiner* — Vincent Peren
(74) *Attorney, Agent, or Firm* — Kirton McConkie; Evan R. Witt

(57) ABSTRACT

A sheet sensing module and a duplex scanning apparatus having the sheet sensing module are provided. The sheet sensing module includes a first sensing arm, a second sensing arm, and an electronic sensor. The first sensing arm is partially exposed to a sheet feeding channel of the duplex scanning apparatus. The second sensing arm is partially exposed to an inverting channel of the duplex scanning apparatus. When a document is transferred through the sheet feeding channel to trigger said first sensing arm or the document is transferred through the inverting channel to trigger the second sensing arm, the electronic sensor generates a sensing signal.

19 Claims, 5 Drawing Sheets

SHEET SENSING MODULE AND DUPLEX SCANNING APPARATUS USING THE SAME

FIELD OF THE INVENTION

The present invention relates to a sheet sensing module, and more particularly to a sheet sensing module for use in an automatic document feeder.

BACKGROUND OF THE INVENTION

Scanning apparatuses are widely used for scanning images of paper documents. The scanned contents of the paper documents can be converted into electronic files in order to be further stored, processed or spread. With increasing development of scanning technologies, the scanning apparatuses have experienced great growth and are now rapidly gaining in popularity. In the early stage, the scanning apparatus can scan one side of the document. For scanning both sides of the document, the document should be manually turned over after one side of the document has been scanned in order to sequentially scan the other side of the document. However, the process of manually turning over the document is troublesome. Recently, a duplex scanning apparatus has been developed to scan both sides of the document.

FIG. 1 is a schematic side view illustrating a conventional duplex printing apparatus. As shown in FIG. 1, the conventional duplex printing apparatus 1 comprises a sheet entrance 10, a sheet exit 11, a sheet feeding channel 12, a sheet transfer channel 13, an inverting channel 14, an image reading module 15, a transfer roller assembly 16, a first sheet sensing module 17, and a second sheet sensing module 18. The sheet feeding channel 12 is arranged between the sheet entrance 10 and the sheet transfer channel 13. The sheet transfer channel 13 is arranged between the sheet feeding channel 12 and the sheet exit 11. A first end of the inverting channel 14 is connected to the junction D11 between the sheet feeding channel 12 and the sheet transfer channel 13. A second end of the inverting channel 14 is connected to the sheet transfer channel 13. The image reading module 15 is located in the sheet transfer channel 13 for reading the image of a document. The transfer roller assembly 16 comprises a plurality of rollers 161-163 for transferring the document that is located within the sheet feeding channel 12, the sheet transfer channel 13 and the inverting channel 14.

The operations of the duplex printing apparatus 1 will be illustrated by referring to the sheet transfer paths S11~S16 of FIG. 1. After the duplex printing apparatus 1 is activated, a document P11 is transmitted into the sheet feeding channel 12 through the sheet entrance 10. Then, the document P11 is transmitted from the sheet feeding channel 12 to the sheet transfer channel 13, so that the image of the first side P11A of the document P11 is read by the image reading module 15. After the reading operation is performed by the image reading module 15, the document P11 is transmitted to the junction D12 between the inverting channel 14 and sheet transfer channel 13. Then, the document P11 is transmitted to the inverting channel 14. Then, the document P11 is introduced into the sheet transfer channel 13 again, so that the image of the second side P11B of the document P11 is read by the image reading module 15. After the reading operation is performed by the image reading module 15, the document P11 is transmitted to the sheet exit 11.

The first sheet sensing module 17 is used for sensing the transmitting status of the document in the sheet feeding channel 12. When the document is transferred through the first sheet sensing module 17, the first sheet sensing module 17 generates a first sensing signal. The second sheet sensing module 18 is used for sensing the transmitting status of the document in the inverting channel 14. When the document is transferred through the second sheet sensing module 18, the second sheet sensing module 18 generates a second sensing signal.

FIG. 2 is a schematic perspective view illustrating the first sheet sensing module of the duplex printing apparatus of FIG. 1. The first sheet sensing module 17 comprises a first optical sensor 171 and a first sensing arm 172. The first optical sensor 171 has a first emitting part 1711 for emitting a light beam and a first receiving part 1712 for receiving the light beam. The first sensing arm 172 has a first rotating part 1721, a first contacting part 1722, and a first sheltering part 1723. The first contacting part 1722 and the first sheltering part 1723 are fixed on the first rotating part 1721.

The first rotating part 1721 has a cylindrical shape. In addition, both ends of the first rotating part 1721 are pivotally coupled with two portions of a supporting member 173, respectively. In a case that the first sensing arm 172 is not triggered, the first contacting part 1722 is partially exposed to the sheet feeding channel 12. Meanwhile, the first sheltering part 1723 is arranged between the first emitting part 1711 and the first receiving part 1712 to shelter the light beam. Consequently, the light beam from the first emitting part 1711 fails to be received by the first receiving part 1712. In a case that any document is transferred through the sheet feeding channel 12 to trigger the first contacting part 1722 of the first sensing arm 172, the first contacting part 1722 is toppled down by the front edge of the advancing document. At the same time, the first sensing arm 172 performs a rotating action with said first rotating part 1721 serving as an axle center, so that the first sheltering part 1723 is moved. Under this circumstance, the light beam from the first emitting part 1711 can be received by the first receiving part 1712, so that a first sensing signal is generated.

FIG. 3 is a schematic perspective view illustrating the second sheet sensing module of the duplex printing apparatus of FIG. 1. The second sheet sensing module 18 comprises a second optical sensor 181 and a second sensing arm 182. The second optical sensor 181 has a second emitting part 1811 for emitting a light beam and a second receiving part 1812 for receiving the light beam. The second sensing arm 182 has a second rotating part 1821, a second contacting part 1822, and a second sheltering part 1823. The second contacting part 1822 and the second sheltering part 1823 are fixed on the second rotating part 1821.

The second rotating part 1821 has a cylindrical shape. In addition, both ends of the second rotating part 1821 are pivotally coupled with two portions of a supporting member 183, respectively. In a case that the second sensing arm 182 is not triggered, the second contacting part 1822 is partially exposed to the inverting channel 14. Meanwhile, the second sheltering part 1823 is arranged between the second emitting part 1811 and the second receiving part 1812 to shelter the light beam. Consequently, the light beam from the second emitting part 1811 fails to be received by the second receiving part 1812. In a case that any document is transferred through the inverting channel 14 to trigger the second contacting part 1822 of the second sensing arm 182, the second contacting part 1822 is toppled down by the front edge of the advancing document. At the same time, the second sensing arm 182 performs a rotating action with said second rotating part 1821 serving as an axle center, so that the second sheltering part 1823 is moved. Under this circumstance, the light beam from the second emitting part 1811 can be received by the second receiving part 1812, so that a second sensing signal is generated.

The controlling mechanism of the duplex printing apparatus 1 will be illustrated as follows. In a case that the duplex printing apparatus 1 is operated in a single-side image scanning mode and the first sheet sensing module 17 generates the first sensing signal, a next document P12 will be transmitted into the sheet feeding channel 12 through the sheet entrance 10. In a case that the duplex printing apparatus 1 is operated in a double-side image scanning mode and the second sheet sensing module 18 generates the second sensing signal, the next document P12 will be transmitted into the sheet feeding channel 12 through the sheet entrance 10. In other words, regardless of the operating mode of the duplex printing apparatus 1, a plurality of documents can be sequentially fed into the sheet feeding channel 12. Moreover, any two adjacent ones of these documents are transferred through the sheet feeding channel 12, the sheet transfer channel 13 and the inverting channel 14 at the same spacing interval.

However, since the controlling mechanism of the duplex printing apparatus 1 needs two or more optical sensors 171 and 181, the conventional duplex printing apparatus 1 is not cost-effective. In other words, the conventional duplex printing apparatus should be further improved.

SUMMARY OF THE INVENTION

The present invention provides a sheet sensing module for use in an automatic document feeder, especially relates to a cost-effective sheet sensing module.

The present invention also provides a duplex printing apparatus using the above sheet sensing module.

In accordance with an aspect of the present invention, there is provided a duplex printing apparatus. The duplex printing apparatus includes a sheet entrance, a sheet exit, a sheet feeding channel, a sheet transfer channel, an inverting channel, an image reading module, a transfer roller assembly, and a a sheet sensing module. The sheet feeding channel is connected to the sheet entrance. The sheet transfer channel is arranged between the sheet feeding channel and the sheet exit. A first end of the inverting channel is connected to a junction between the sheet feeding channel and the sheet transfer channel. A second end of the inverting channel is connected to the sheet transfer channel. The image reading module is located in the sheet transfer channel for reading an image of a document. The transfer roller assembly is used for transferring the document when the document is located within the sheet feeding channel, the sheet transfer channel and the inverting channel. The sheet sensing module includes a first sensing arm, a second sensing arm, and an electronic sensor. The first sensing arm is at least partially exposed to the sheet feeding channel. The second sensing arm is at least partially exposed to the inverting channel. When the document is transferred through the sheet feeding channel to trigger the first sensing arm or the document is transferred through the inverting channel to trigger the second sensing arm, the electronic sensor generates a sensing signal.

In an embodiment, the electronic sensor is an optical sensor, wherein the optical sensor has an emitting part for emitting a light beam and a receiving part for receiving the light beam.

In an embodiment, the first sensing arm includes a first rotating part and a first contacting part fixed on the first rotating part, and the first contacting part is at least partially exposed to the sheet feeding channel. The second sensing arm includes a second rotating part and a second contacting part fixed on the second rotating part, and the second contacting part is at least partially exposed to the inverting channel. When the first contacting part is pushed by the document, the first sensing arm performs a first rotating action with the first rotating part serving as an axle center. When the second contacting part is pushed by the document, the second sensing arm performs a second rotating action with the second rotating part serving as an axle center.

In an embodiment, the first sensing arm further includes a sheltering part and a first linking part, and the sheltering part and the first linking part are fixed on the first rotating part, so that the sheltering part is synchronously rotated in response to the first rotating action of the first sensing arm. The second sensing arm further includes a second linking part, and the second linking part is fixed on the second rotating part, so that the second linking part is synchronously rotated in response to the second rotating action of the second sensing arm. Moreover, in response to the second rotating action of the second sensing arm, the first linking part is pushed by the second linking part, so that the first sensing arm performs the first rotating action.

In an embodiment, before the first sensing arm performs the first rotating action, the sheltering part is arranged between the emitting part and the receiving part, so that the light beam from the emitting part fails to be received by the receiving part.

In an embodiment, the second sensing arm further includes a sheltering part and a second linking part, and the sheltering part and the second linking part are fixed on the second rotating part, so that the sheltering part is synchronously rotated in response to the second rotating action of the second sensing arm. The first sensing arm further includes a first linking part, and the first linking part is fixed on the first rotating part, so that the first linking part is synchronously rotated in response to the first rotating action of the first sensing arm. Moreover, in response to the first rotating action of the first sensing arm, the second linking part is pushed by the first linking part, so that the second sensing arm performs the second rotating action.

In an embodiment, before the second sensing arm performs the second rotating action, the sheltering part is arranged between the emitting part and the receiving part, so that the light beam from the emitting part fails to be received by the receiving part.

In an embodiment, the first rotating action and the second rotating action have opposite rotating directions.

In an embodiment, the duplex printing apparatus is operated in a single-side image scanning mode or a double-side image scanning mode. If the duplex printing apparatus is operated in the single-side image scanning mode, the document is not allowed to be transferred through the inverting channel.

In an embodiment, if the duplex printing apparatus is operated in the single-side image scanning mode and the document is transferred through the sheet feeding channel to trigger the first sensing arm, a next document is fed into the sheet feeding channel through the sheet entrance.

In an embodiment, if the duplex printing apparatus is operated in the double-side image scanning mode and the document is transferred through the inverting channel to trigger the second sensing arm, a next document is fed into the sheet feeding channel through the sheet entrance.

In an embodiment, the duplex printing apparatus further includes a sheet pick-up module, which is located near the sheet entrance for transferring the document into the sheet feeding channel In an embodiment, the duplex printing apparatus further includes a sheet input tray, which is located near the sheet pick-up module for placing the document thereon.

In an embodiment, the duplex printing apparatus further includes a sheet output tray, which is located near the sheet exit, wherein the document ejected from the sheet exit is supported on the sheet output tray.

In an embodiment, the duplex printing apparatus further includes an enabling sensor, which is arranged between the junction and the image reading module for detecting whether the document is transferred through a location of the enabling sensor. If the enabling sensor detects that the document is transferred through the location of the enabling sensor, the image reading module is enabled.

In accordance with another aspect of the present invention, there is provided a sheet sensing module for an automatic document feeder. The automatic document feeder includes a first sheet transfer channel and a second sheet transfer channel. The sheet sensing module includes a first sensing arm, a second sensing arm, a sheltering part, and an electronic sensor. The first sensing arm includes a first rotating part, a first contacting part and a first linking part. The first contacting part and the first linking part are fixed on the first rotating part. The first contacting part is arranged between the first sheet transfer channel and the second sheet transfer channel. The first contacting part is at least partially exposed to the first sheet transfer channel. The second sensing arm includes a second rotating part, a second contacting part and a second linking part. The second contacting part and the second linking part are fixed on the second rotating part. The second contacting part is arranged between the first sheet transfer channel and the second sheet transfer channel. The second contacting part is at least partially exposed to the second sheet transfer channel. The sheltering part is fixed on the first rotating part. When the second contacting part is pushed, the second sensing arm performs a second rotating action with the second rotating part serving as an axle center, so that the second linking part is synchronously rotated. When the first contacting part is pushed or when the second linking part is rotated to push the first linking part, the first sensing arm performs a first rotating action with the first rotating part serving as an axle center, so that the sheltering part is synchronously rotated. When the first contacting part is pushed or when the second contacting part is pushed, the electronic sensor generates a sensing signal.

In an embodiment, the electronic sensor is an optical sensor, wherein the optical sensor has an emitting part for emitting a light beam and a receiving part for receiving the light beam.

In an embodiment, before the first sensing arm performs the first rotating action, the sheltering part is arranged between the emitting part and the receiving part, so that the light beam from the emitting part fails to be received by the receiving part.

In an embodiment, the first rotating action and the second rotating action have opposite rotating directions.

In an embodiment, the sheet sensing module is further applied to a duplex scanning apparatus, which is configured for performing a duplex scanning operation on a document.

In an embodiment, the duplex scanning apparatus includes a sheet entrance, a sheet exit, a third sheet transfer channel, and an image reading module. The first sheet transfer channel is connected to the sheet entrance. The third sheet transfer channel is arranged between the first sheet transfer channel and the sheet exit. The image reading module is located in the third sheet transfer channel for reading an image of the document. A first end of the second sheet transfer channel is connected to a junction between the first sheet transfer channel and the second sheet transfer channel, and a second end of the second sheet transfer channel is connected to the third sheet transfer channel, so that the second sheet transfer channel is served as an inverting channel for the transferring the document.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
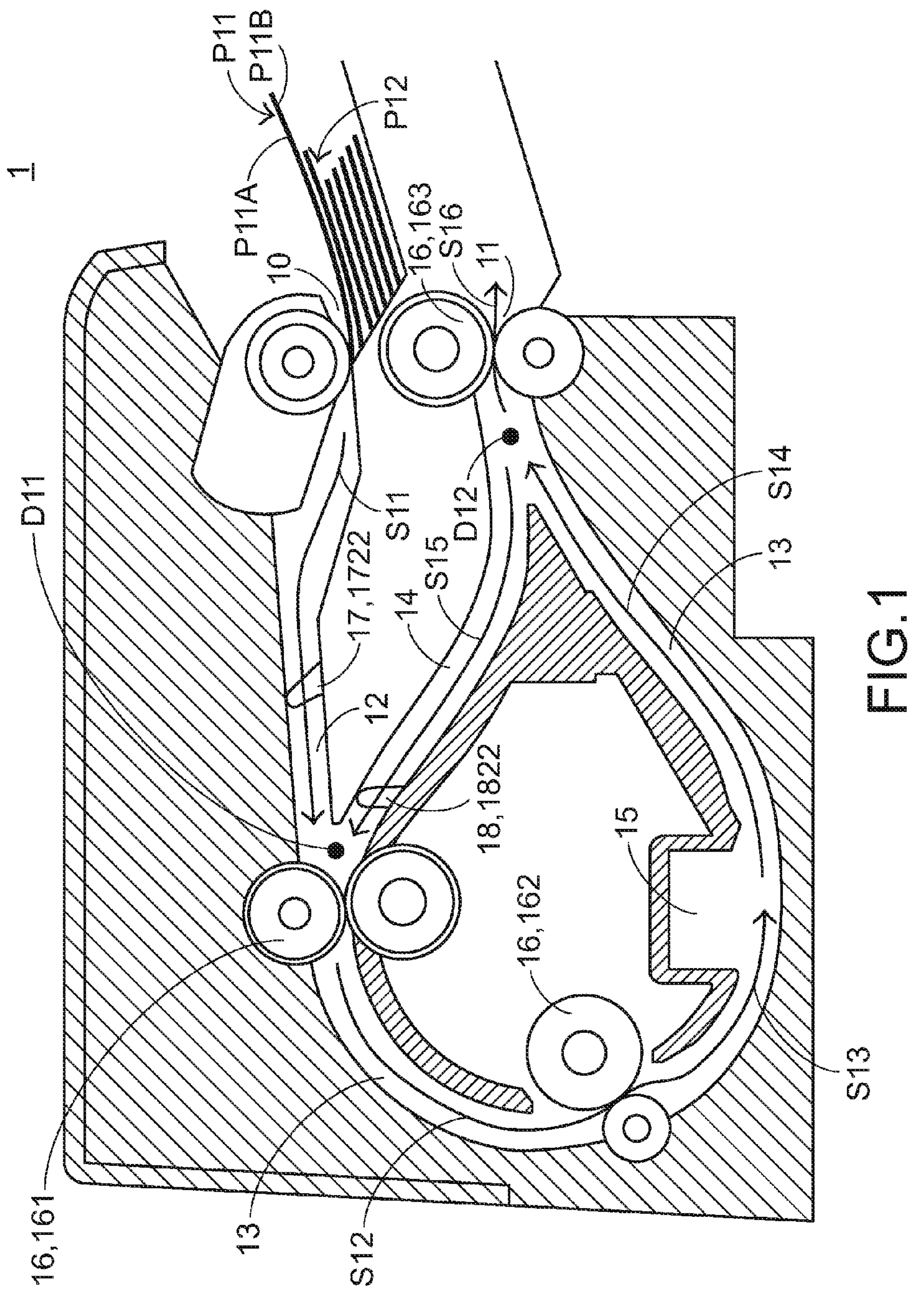
FIG. 1 PRIOR ART
FIG. 1 is a schematic side view illustrating a conventional duplex printing apparatus.
Figure 2:
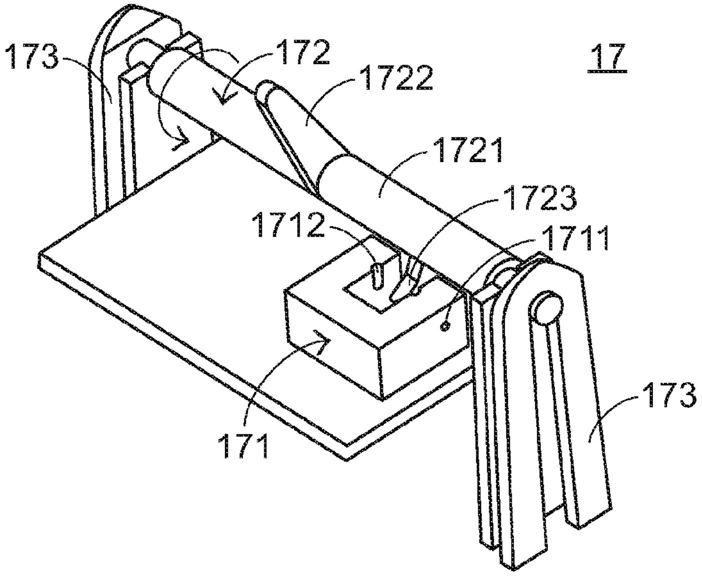
FIG.2 PRIOR ART
FIG. 2 is a schematic perspective view illustrating the first sheet sensing module of the duplex printing apparatus of FIG. 1.
Figure 3:
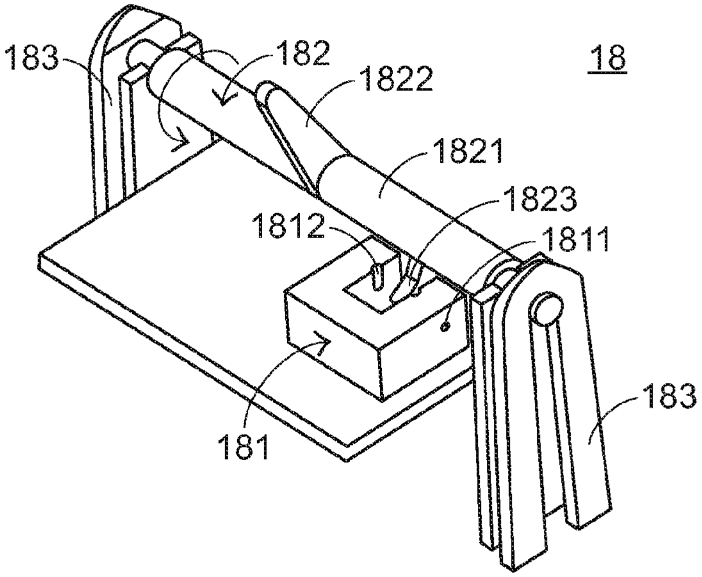
FIG.3 PRIOR ART
FIG. 3 is a schematic perspective view illustrating the second sheet sensing module of the duplex printing apparatus of FIG. 1.
Figure 4:
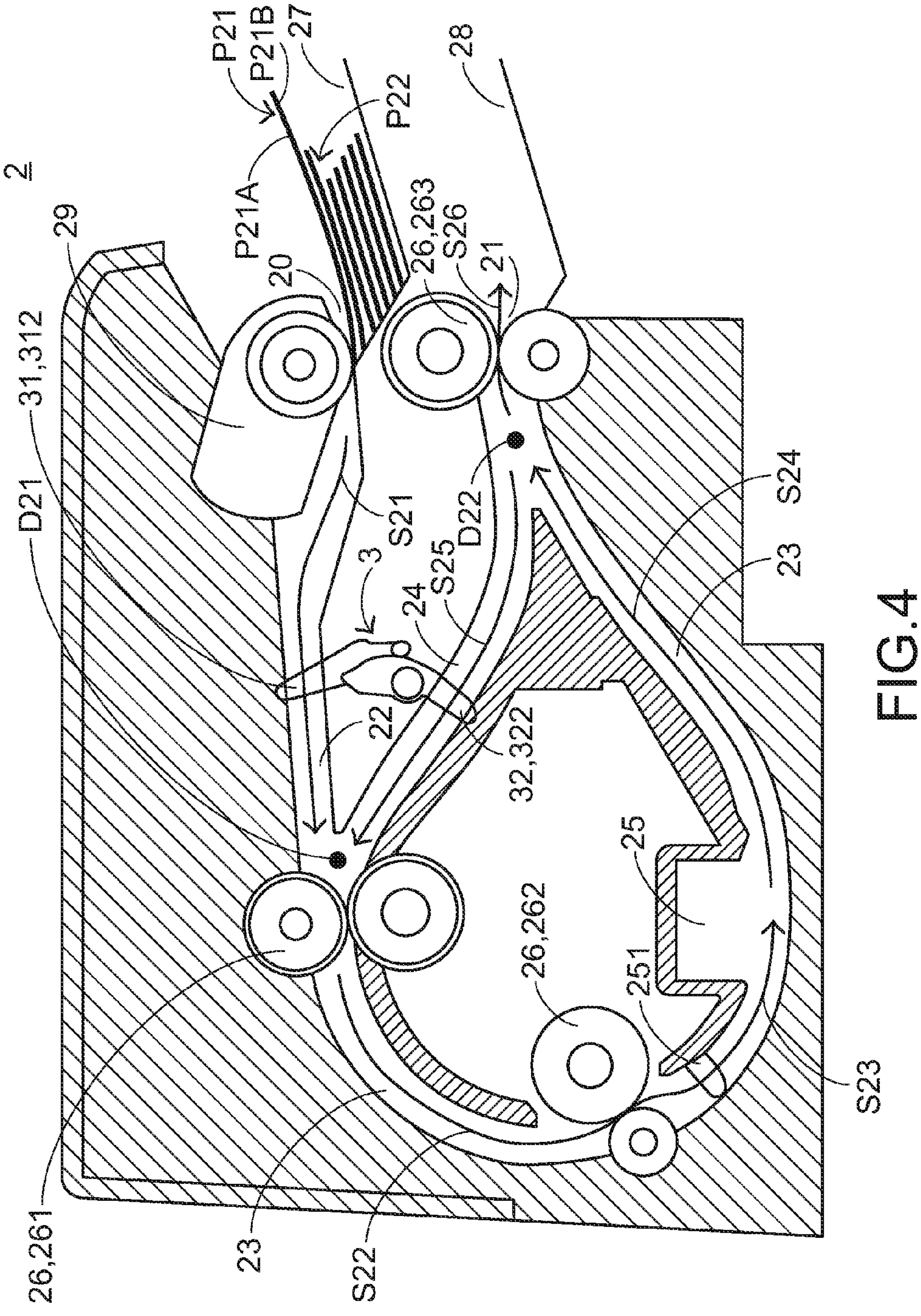
FIG. 4 is a schematic side view illustrating a duplex printing apparatus according to an embodiment of the present invention.

FIG. 4 is a schematic side view illustrating a duplex printing apparatus according to an embodiment of the present invention. As shown in FIG. 4, the duplex printing apparatus 2 comprises a sheet entrance 20, a sheet exit 21, a sheet feeding channel 22, a sheet transfer channel 23, an inverting channel 24, an image reading module 25, a transfer roller assembly 26, a sheet input tray 27, a sheet output tray 28, and a sheet pick-up module 29. The sheet feeding channel 22 is arranged between the sheet entrance 20 and the sheet transfer channel 23. The sheet transfer channel 23 is arranged between the sheet feeding channel 22 and the sheet exit 21. A first end of the inverting channel 24 is connected to the junction D21 between the sheet feeding channel 22 and the sheet transfer channel 23. A second end of the inverting channel 24 is connected to the sheet transfer channel 23. The image reading module 25 is located in the sheet transfer channel 23 for reading the image of a document. The transfer roller assembly 26 comprises a plurality of rollers 261~263 for transferring the document within the sheet feeding channel 22, the sheet transfer channel 23 and the inverting channel 24. Moreover, the sheet input tray 27 is located near the sheet entrance 20. The documents to be scanned (e.g. P21, P22) are placed on the sheet input tray 27, and sequentially fed into the sheet feeding channel 22 by the sheet pick-up module 29. The sheet output tray 28 is located near the sheet exit 21 for supporting the document that is ejected from the sheet exit 21. It is noted that the sheet input tray 27 and the sheet output tray 28 are not essential components of the duplex printing apparatus 2 of the present invention.

The operations of the duplex printing apparatus 3 will be illustrated by referring to the sheet transfer paths S21~S26 of FIG. 4. After the duplex printing apparatus 2 is activated, a document P21 placed on the sheet input tray 27 is transmitted into the sheet feeding channel 22 through the sheet entrance 20 by the sheet pick-up module 29. Then, the document P21 is transmitted from the sheet feeding channel 22 to the sheet transfer channel 23, so that the image of the first side P21A of the document P21 is read by the image reading module 25. After the reading operation is performed by the image reading module 25, the document P21 is transmitted to the junction D22 between the inverting channel 24 and sheet transfer channel 23. Then, the document P21 is transmitted to the inverting channel 24. Then, the document P21 is introduced into the sheet transfer channel 23 again, so that the image of the second side P21B of the document P21 is read by the image reading module 25. After the reading operation is performed by the image reading module 25, the document P21 is transmitted to the sheet exit 21 and ejected to and placed on the sheet output tray 28.

An exemplary sheet sensing module applied to the duplex printing apparatus 3 is also shown in FIG. 4. The sheet sensing module 3 comprises a first sensing arm 31, a second sensing arm 32, and an electronic sensor 33. The first sensing arm 31 is partially exposed to the sheet feeding channel 22. The second sensing arm 32 is partially exposed to the inverting channel 24. In a case that any document is transferred through the sheet feeding channel 22 to trigger the first sensing arm 31 or any document is transferred through the inverting channel 24 to trigger the second sensing arm 32, the electronic sensor 33 generates a sensing signal.

Figure 5A:
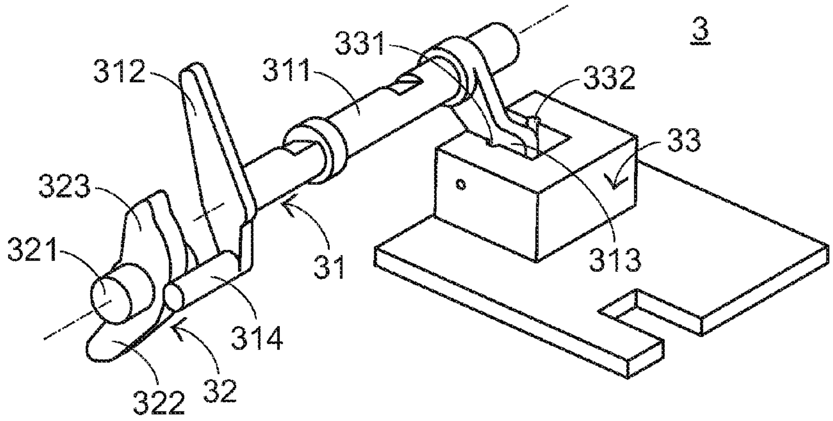
FIG. 5A is a schematic perspective view illustrating a portion of the sheet sensing module of the duplex printing apparatus of FIG. 4.

FIG. 5A is a schematic perspective view illustrating a portion of the sheet sensing module of the duplex printing apparatus of FIG. 4. As shown in FIG. 5A, the first sensing arm 31 and the second sensing arm 32 are not triggered. In this situation, the electronic sensor 33 is an optical sensor. The optical sensor 33 has an emitting part 331 for emitting a light beam and a receiving part 332 for receiving the light beam.

The first sensing arm 31 has a first rotating part 311, a first contacting part 312, a first linking part 314, and a sheltering part 313. The first contacting part 312, the first linking part 314 and the sheltering part 313 are fixed on the first rotating part 311. The first rotating part 311 has a cylindrical shape. In addition, both ends of the first rotating part 311 are pivotally coupled with two supporting members, respectively. For clearly illustrating the relation between other components, these two supporting members are not shown. The first contacting part 312 is partially exposed to the sheet feeding channel 22. The sheltering part 313 is arranged between the emitting part 331 and the receiving part 332 to shelter the light beam. Consequently, the light beam from the emitting part 331 fails to be received by the receiving part 332.

The second sensing arm 32 has a second rotating part 321, a second contacting part 322, and a second linking part 32. The second contacting part 322 and the second linking part 323 are fixed on the second rotating part 321. The second rotating part 321 has a cylindrical shape. In addition, both ends of the second rotating part 321 are pivotally coupled with other two supporting members, respectively. For clearly illustrating the relation between other components, these two supporting members are not shown. The second contacting part 322 is partially exposed to the inverting channel 24. The second linking part 323 is in contact with the first linking part 314. The first linking part 314 may be separated from the first linking part 314 by a gap as long as a linkage relationship between the first linking part 314 and the second linking part 323 can be established.

Figure 5B:
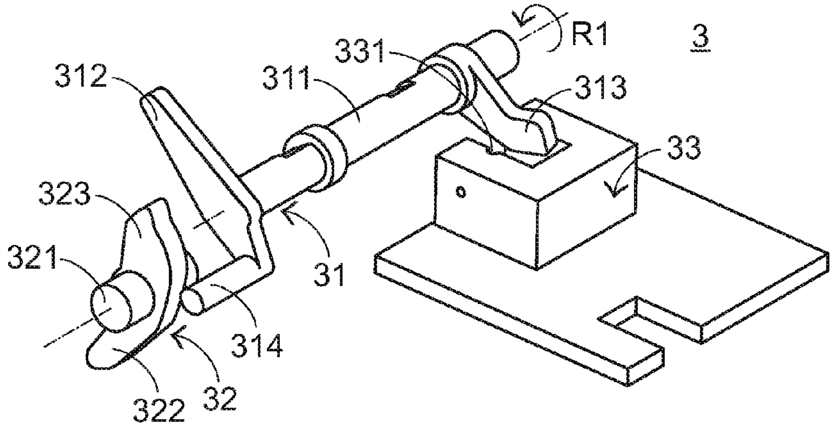
FIG. 5B is a schematic perspective view illustrating the sheet sensing module of FIG. 5A, in which the first sensing arm is triggered.

FIG. 5B is a schematic perspective view illustrating the sheet sensing module of FIG. 5A, in which the first sensing arm is triggered. In a case that any document is transferred through the sheet feeding channel 22 to trigger the first contacting part 312 of the first sensing arm 31, the first contacting part 312 is toppled down by the front edge of the advancing document. At the same time, the first sensing arm 31 is rotated in a first direction R1 (i.e. a first rotating action) with the first rotating part 311 serving as an axle center. Consequently, the sheltering part 313 is departed from the region between the emitting part 331 and the receiving part 332. Under this circumstance, the light beam from the emitting part 331 can be received by the first receiving part 332, so that a sensing signal is generated. During the above process, the second sensing arm is immobile.

Figure 5C:
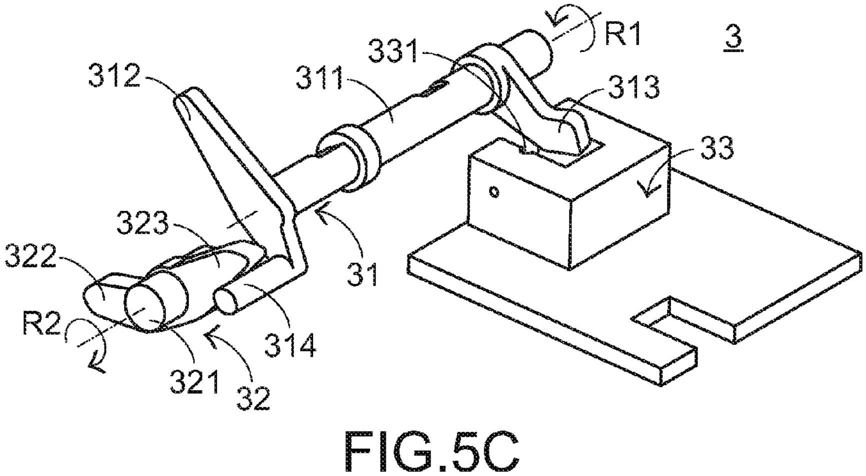
FIG. 5C is a schematic perspective view illustrating the sheet sensing module of FIG. 5A, in which the second sensing arm is triggered.

FIG. 5C is a schematic perspective view illustrating the sheet sensing module of FIG. 5A, in which the second sensing arm is triggered. In a case that any document is transferred through the inverting channel 24 to trigger the second contacting part 322 of the second sensing arm 32, the second sensing arm 32 is toppled down by the front edge of the advancing document. At the same time, the second sensing arm 32 is rotated in a second direction R2 (i.e. a second rotating action) with the second rotating part 321 serving as an axle center. Consequently, the second linking part 323 is synchronously rotated. During rotation of the second linking part 323, the first linking part 314 is pushed by the second linking part 323, so that the first sensing arm 31 is rotated in the first direction R1 (i.e. the first rotating action) with the first rotating part 311 serving as an axle center. Similarly, the sheltering part 313 is departed from the region between the emitting part 331 and the receiving part 332. Under this circumstance, the light beam from the emitting part 331 can be received by the first receiving part 332, so that a sensing signal is generated.

The controlling mechanism of the duplex printing apparatus 2 will be illustrated as follows. In a case that the duplex printing apparatus 1 is operated in a single-side image scanning mode, a next document P22 placed on the sheet input tray 27 will be fed into the sheet feeding channel 22 through the sheet entrance 20 by the sheet pick-up module 29 in response to every sensing signal from the sheet sensing module 3. In a case that the duplex printing apparatus 1 is operated in a double-side image scanning mode, the next document P22 placed on the sheet input tray 27 will be fed into the sheet feeding channel 22 through the sheet entrance 20 by the sheet pick-up module 29 in response to every two sensing signal from the sheet sensing module 3.

In other words, regardless of the operating mode of the duplex printing apparatus 2, a plurality of documents placed on the sheet input tray 27 can be sequentially fed into the sheet feeding channel 22. Moreover, any two adjacent ones of these documents are transferred through the sheet feeding channel 22, the sheet transfer channel 23 and the inverting channel 24 at the same spacing interval.

Moreover, the duplex printing apparatus 2 further comprises an enabling sensor 251. The enabling sensor 251 is arranged between the junction D21 (i.e. the junction between the sheet feeding channel 22 and the sheet transfer channel 23) and the image reading module 25. The enabling sensor 251 is used for detecting whether the document is transferred through the location of the enabling sensor 251, thereby determining whether the image reading module 25 is enabled or not. That is, if the enabling signal is not outputted from the enabling sensor 251, the image reading module 25 is in an idle status to achieve power-saving efficacy. The operating principles of the enabling sensor 251 to detect whether the document is transferred through its location may be identical to the optical sensing mechanism of the sheet sensing module 3, and are not redundantly described herein.

In this embodiment, the rotating direction R1 of the first rotating action is opposite to the rotating direction R2 of the second rotating action. In a case that the document P21 is transferred to the inverting channel 24 to trigger the second sensing arm 322, the next document P22 placed on the sheet input tray 27 will be transferred to the sheet feeding channel 22. At the same time, the first contacting part 312 of the first sensing arm 31 will not be synchronously rotated to hinder or influence the movement of the next document P22.

The above embodiments are illustrated by referring to a duplex printing apparatus. Nevertheless, those skilled in the art will readily observe that numerous modifications and alterations may be made while retaining the teachings of the invention. For example, the sheet sensing module may be turned upside down. In a case that the first sensing arm and the second sensing arm are not triggered, the first contacting part is partially exposed to the inverting channel, and the second contacting part is partially exposed to the sheet feeding channel.

In some embodiments, the operating principle of the sheet sensing module may be altered. For example, in a case that the first sensing arm and the second sensing arm are not triggered, the location of the sheltering part is no longer arranged between the emitting part and the receiving part. Normally, the light beam from the emitting part is received by the receiving part. In a case that the first sensing arm or the second sensing arm is triggered, the sheltering part is correspondingly moved to the region between the emitting part and the receiving part to shelter the light beam. Meanwhile, the light beam from the emitting part fails to be received by the receiving part, and thus the electronic sensor generates the sensing signal.

Figure 6:
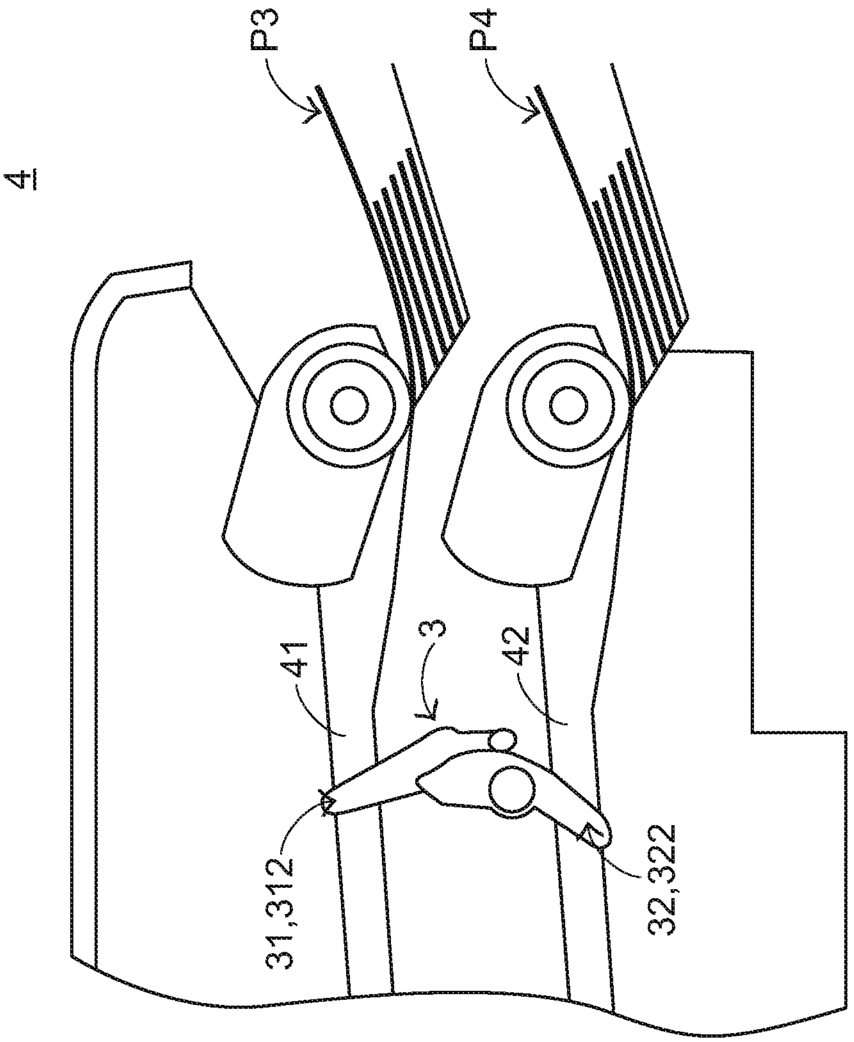
FIG. 6 is schematic side view illustrating a sheet sensing module applied to an automatic document feeder according to an embodiment of the present invention.

In the above embodiments, the sheet sensing module is applied to the duplex printing apparatus. Moreover, the sheet sensing module may be applied to an automatic document feeder. FIG. 6 is schematic side view illustrating a sheet sensing module applied to an automatic document feeder according to an embodiment of the present invention. As shown in FIG. 6, the automatic document feeder 4 comprises a first sheet transfer channel 41 and a second sheet transfer channel 42. The first sheet transfer channel 41 is a path for transmitting a first document P3. The second sheet transfer channel 42 is a path for transmitting a second document P4. The first contacting part 312 of the first sensing arm 31 of the sheet sensing module 3 is partially exposed to the first sheet transfer channel 41. The second contacting part 322 of the second sensing arm 32 of the sheet sensing module 3 is partially exposed to the second sheet transfer channel 42. From the teachings of the above embodiments, when the first contacting part 312 is pushed by the first document P3 or the second contacting part 322 is pushed by the second document P4, the sheet sensing module 3 generates the sensing signal. In response to the sensing signal, the automatic document feeder 4 will perform the next action of feeding the next document into the first sheet transfer channel 41 or the second sheet transfer channel 42 for example.

From the above description, the sheet sensing module of the present invention is capable of sensing the transmitting status of the document in at least two channels by using a single electronic sensor. Consequently, the automatic document feeder with the sheet sensing module of the present invention is more cost-effective.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A duplex printing apparatus, comprising:

a sheet entrance and a sheet exit;

a sheet feeding channel connected to said sheet entrance;

a sheet transfer channel arranged between said sheet feeding channel and said sheet exit;

an inverting channel, wherein a first end of said inverting channel is connected to a junction between said sheet feeding channel and said sheet transfer channel, and a second end of said inverting channel is connected to said sheet transfer channel;

an image reading module located in said sheet transfer channel for reading an image of a document;

a transfer roller assembly for transferring said document when said document is located within said sheet feeding channel, said sheet transfer channel and said inverting channel; and a sheet sensing module comprising:

a first sensing arm at least partially exposed to said sheet feeding channel;

a second sensing arm at least partially exposed to said inverting channel; and an electronic sensor, wherein when said document is transferred through said sheet feeding channel to trigger said first sensing arm or said document is transferred through said inverting channel to trigger said second sensing arm, said electronic sensor generates a sensing signal.

2. The duplex printing apparatus according to claim 1 wherein said electronic sensor is an optical sensor, wherein said optical sensor has an emitting part for emitting a light beam and a receiving part for receiving said light beam.

3. The duplex printing apparatus according to claim 2 wherein said first sensing arm comprises a first rotating part and a first contacting part fixed on said first rotating part, and said first contacting part is at least partially exposed to said sheet feeding channel, wherein said second sensing arm comprises a second rotating part and a second contacting part fixed on said second rotating part, and said second contacting part is at least partially exposed to said inverting channel, wherein when said first contacting part is pushed by said document, said first sensing arm performs a first rotating action with said first rotating part serving as an axle center, wherein when said second contacting part is pushed by said document, said second sensing arm performs a second rotating action with said second rotating part serving as an axle center.

4. The duplex printing apparatus according to claim 3 wherein said first sensing arm further comprises a sheltering part and a first linking part, and said sheltering part and said first linking part are fixed on said first rotating part, so that said sheltering part is synchronously rotated in response to said first rotating action of said first sensing arm, wherein said second sensing arm further comprises a second linking part, and said second linking part is fixed on said second rotating part, so that said second linking part is synchronously rotated in response to said second rotating action of said second sensing arm, wherein in response to said second rotating action of said second sensing arm, said first linking part is pushed by said second linking part, so that said first sensing arm performs said first rotating action.

5. The duplex printing apparatus according to claim 4 wherein before said first sensing arm performs said first rotating action, said sheltering part is arranged between said emitting part and said receiving part, so that said light beam from said emitting part fails to be received by said receiving part.

6. The duplex printing apparatus according to claim 3 wherein said second sensing arm further comprises a sheltering part and a second linking part, and said sheltering part and said second linking part are fixed on said second rotating part, so that said sheltering part is synchronously rotated in response to said second rotating action of said second sensing arm, wherein said first sensing arm further comprises a first linking part, and said first linking part is fixed on said first rotating part, so that said first linking part is synchronously rotated in response to said first rotating action of said first sensing arm, wherein in response to said first rotating action of said first sensing arm, said second linking part is pushed by said first linking part, so that said second sensing arm performs said second rotating action.

7. The duplex printing apparatus according to claim 6 wherein before said second sensing arm performs said second rotating action, said sheltering part is arranged between said emitting part and said receiving part, so that said light beam from said emitting part fails to be received by said receiving part.

8. The duplex printing apparatus according to claim 3 wherein said first rotating action and said second rotating action have opposite rotating directions.

9. The duplex printing apparatus according to claim 1 wherein said duplex printing apparatus is operated in a single-side image scanning mode or a double-side image scanning mode, wherein if said duplex printing apparatus is operated in said single-side image scanning mode, said document is not allowed to be transferred through said inverting channel.

10. The duplex printing apparatus according to claim 9 wherein if said duplex printing apparatus is operated in said single-side image scanning mode and said document is transferred through said sheet feeding channel to trigger said first sensing arm, a next document is fed into said sheet feeding channel through said sheet entrance.

11. The duplex printing apparatus according to claim 9 wherein if said duplex printing apparatus is operated in said double-side image scanning mode and said document is transferred through said inverting channel to trigger said second sensing arm, a next document is fed into said sheet feeding channel through said sheet entrance.

12. The duplex printing apparatus according to claim 1 further comprising a sheet pick-up module, which is located near said sheet entrance for transferring said document into said sheet feeding channel.

13. The duplex printing apparatus according to claim 12 further comprising a sheet input tray, which is located near said sheet pick-up module for placing said document thereon.

14. The duplex printing apparatus according to claim 1 further comprising a sheet output tray, which is located near said sheet exit, wherein said document ejected from said sheet exit is supported on said sheet output tray.

15. The duplex printing apparatus according to claim 1 further comprising an enabling sensor, which is arranged between said junction and said image reading module for detecting whether said document is transferred through a location of said enabling sensor, wherein if said enabling sensor detects that said document is transferred through said location of said enabling sensor, said image reading module is enabled.

16. A sheet sensing module for an automatic document feeder, said automatic document feeder comprising a first sheet transfer channel and a second sheet transfer channel, said sheet sensing module comprising:

a first sensing arm comprising a first rotating part, a first contacting part and a first linking part, wherein said first contacting part and said first linking part are fixed on said first rotating part, said first contacting part is arranged between said first sheet transfer channel and said second sheet transfer channel, and said first contacting part is at least partially exposed to said first sheet transfer channel;

a second sensing arm comprising a second rotating part, a second contacting part and a second linking part, wherein said second contacting part and said second linking part are fixed on said second rotating part, said second contacting part is arranged between said first sheet transfer channel and said second sheet transfer channel, and said second contacting part is at least partially exposed to said second sheet transfer channel;

a sheltering part fixed on said first rotating part, wherein when said second contacting part is pushed, said second sensing arm performs a second rotating action with said second rotating part serving as an axle center, so that said second linking part is synchronously rotated, wherein when said first contacting part is pushed or when said second linking part is rotated to push said first linking part, said first sensing arm performs a first rotating action with said first rotating part serving as an axle center, so that said sheltering part is synchronously rotated; and an electronic sensor, wherein when said first contacting part is pushed or when said second contacting part is pushed, said electronic sensor generates a sensing signal, wherein said sheet sensing module is further applied to a duplex scanning apparatus, which is configured for performing a duplex scanning operation on a document, wherein said duplex scanning apparatus comprises:

a sheet entrance and a sheet exit, wherein said first sheet transfer channel is connected to said sheet entrance;

a third sheet transfer channel arranged between said first sheet transfer channel and said sheet exit; and an image reading module located in said third sheet transfer channel for reading an image of said document, wherein a first end of said second sheet transfer channel is connected to a junction between said first sheet transfer channel and said second sheet transfer channel, and a second end of said second sheet transfer channel is connected to said third sheet transfer channel, so that said second sheet transfer channel is served as an inverting channel for said transferring said document.

17. The sheet sensing module according to claim 16 wherein said electronic sensor is an optical sensor, wherein said optical sensor has an emitting part for emitting a light beam and a receiving part for receiving said light beam.

18. The sheet sensing module according to claim 17 wherein before said first sensing arm performs said first rotating action, said sheltering part is arranged between said emitting part and said receiving part, so that said light beam from said emitting part fails to be received by said receiving part.

19. The sheet sensing module according to claim 16 wherein said first rotating action and said second rotating action have opposite rotating directions.

* * * * *